United States Patent
Matteini et al.

(10) Patent No.: US 10,424,802 B2
(45) Date of Patent: Sep. 24, 2019

(54) RECHARGEABLE ELECTROCHEMICAL DEVICE FOR PRODUCING ELECTRIC ENERGY

(71) Applicant: NE.M.E.SYS. SRL, Sesto Fiorentino FI (IT)

(72) Inventors: Marco Matteini, Quarrata (IT); Piero Ulivieri, Montopoli in Val d'Arno (IT); Serena Santiccioli, Quarrata (IT); Marco Maria Mele, Rome (IT)

(73) Assignee: NE.M.E.SYS. SRL, Sesto Fiorentino FI (IT)

( * ) Notice: Subject to any disclaimer, the term of this patent is extended or adjusted under 35 U.S.C. 154(b) by 47 days.

(21) Appl. No.: 15/760,236

(22) PCT Filed: Apr. 11, 2017

(86) PCT No.: PCT/IB2017/052075
§ 371 (c)(1),
(2) Date: Mar. 15, 2018

(87) PCT Pub. No.: WO2017/178964
PCT Pub. Date: Oct. 19, 2017

(65) Prior Publication Data
US 2018/0261870 A1    Sep. 13, 2018

(30) Foreign Application Priority Data
Apr. 14, 2016  (IT) .............. 1020160038574

(51) Int. Cl.
*H01M 8/18*  (2006.01)
*H01M 4/86*  (2006.01)
(Continued)

(52) U.S. Cl.
CPC ......... *H01M 8/186* (2013.01); *H01M 4/8615* (2013.01); *H01M 4/8657* (2013.01);
(Continued)

(58) Field of Classification Search
CPC .... H01M 8/186; H01M 4/921; H01M 8/1007; H01M 8/1067; H01M 4/8615; H01M 4/8657
See application file for complete search history.

(56) References Cited

U.S. PATENT DOCUMENTS 5,316,643 A     5/1994  Ahn et al.
5,460,705 A  * 10/1995  Murphy ............. B01D 53/22
                                              204/252
(Continued)

FOREIGN PATENT DOCUMENTS

WO          01/37359 A2    5/2001

OTHER PUBLICATIONS

International Search Report, PCT Patent Appln. No. PCT/IB2017/052075, dated May 7, 2017.
(Continued)

*Primary Examiner* — Stewart A Fraser
(74) *Attorney, Agent, or Firm* — Nancy J. Flint, Attorney at Law, P.A.; Nancy J. Flint, Esq.

(57) ABSTRACT

An innovative device that integrates, internally to one individual electrochemical cell, the functions of an electrolyzer, a hydrogen accumulator, and a fuel cell. The device can be recharged both electrically, by connecting it to a usual battery charger, and by way of a direct injection of gaseous hydrogen. The present device is very compact and features a reduced weight, consequently it can be advantageously used both to supply power to small-size portable electronic devices and to supply power to motors of electric vehicles.

20 Claims, 2 Drawing Sheets

(51) Int. Cl.

| | | |
|---|---|---|
| *H01M 4/92* | (2006.01) | |
| *H01M 8/065* | (2016.01) | |
| *H01M 8/04089* | (2016.01) | |
| *H01M 8/04119* | (2016.01) | |
| *H01M 8/04082* | (2016.01) | |
| *H01M 8/2457* | (2016.01) | |
| *H01M 8/2484* | (2016.01) | |
| *H01M 8/1007* | (2016.01) | |
| *H01M 8/1067* | (2016.01) | |
| *H01M 8/248* | (2016.01) | |
| *H01M 8/1018* | (2016.01) | |

(52) U.S. Cl.
CPC ......... *H01M 4/8668* (2013.01); *H01M 4/921* (2013.01); *H01M 4/926* (2013.01); *H01M 8/04089* (2013.01); *H01M 8/04141* (2013.01); *H01M 8/04201* (2013.01); *H01M 8/04216* (2013.01); *H01M 8/065* (2013.01); *H01M 8/1007* (2016.02); *H01M 8/1067* (2013.01); *H01M 8/2457* (2016.02); *H01M 8/2484* (2016.02); *H01M 8/248* (2013.01); *H01M 2008/1095* (2013.01); *Y02E 60/528* (2013.01)

(56) References Cited

U.S. PATENT DOCUMENTS

| | | | |
|---|---|---|---|
| 5,972,196 A * | 10/1999 | Murphy | B01D 53/22 204/157.15 |
| 6,733,910 B1 * | 5/2004 | Kralick | H01M 8/0267 429/434 |
| 2001/0033959 A1 | 10/2001 | Ovshinsky et al. | |
| 2014/0057138 A1 * | 2/2014 | Brett | H01M 8/0228 429/7 |
| 2014/0234734 A1 | 8/2014 | Tsutsumi | |
| 2015/0299877 A1 | 10/2015 | Mofakhami et al. | |

OTHER PUBLICATIONS

Written Opinion, PCT Patent Appln. No. PCT/IB2017/052075, dated May 7, 2017.

* cited by examiner

RECHARGEABLE ELECTROCHEMICAL DEVICE FOR PRODUCING ELECTRIC ENERGY

TECHNICAL FIELD

The present invention refers to the field of electrochemical devices for producing and accumulating energy, especially those used to supply power to electric vehicles.

In particular, the scope of the present invention is a device capable of accumulating energy as well as of producing it, by using hydrogen combined with oxygen as an energy source.

The electrochemical device can be recharged both from electric energy and by way of a direct injection of gaseous hydrogen.

PRESENT STATUS OF THE ART

Electrochemical devices are known, capable of storing electric energy in the form of chemical energy; depending on where energy is stored, these devices are classified into batteries, or electrochemical cells, and fuel cells. In a battery, energy is stored in the battery itself whereas in a fuel cell energy is stored in a fuel external to the cell itself, whereas the comburent is typically the oxygen contained in the surrounding air. Therefore, a fuel cell is a device that converts chemical energy into electric energy, but the latter cannot be stored internally to the fuel cell.

In a battery, or electrochemical cell, energy transformation, from chemical to electric, takes place thanks to an oxidation-reduction reaction, wherein a first substance undergoes an oxidation process, whereby it loses electrons, whereas a second substance gains said electrons, thus undergoing a reduction process.

Every battery has a positive pole, which is called cathode, and a negative pole, which is called anode, the latter having an electric potential level lower than the cathode's one.

Whenever a battery is connected to an external circuit, electrons flow from the negative pole and generate a continuous electric current; the difference of electric potential that generates the electric flow is a function of the oxidation and reduction reactions and the production of electric energy stops as soon as these chemical reactions reach an equilibrium state.

Batteries are charged with energy in the form of electric energy, via a power supply unit usually referred to as battery charger; the time necessary to transform electric energy into electrochemical energy depends on the characteristics of the battery, as well as on those of the power supply unit.

In order to shorten the charging time, more powerful power supply units can be built however, for any types of known batteries, a limit is identified, typical of the technology used, beyond which a fast physical deterioration of the battery is triggered and the number of possible charge-discharge cycles is drastically reduced.

In order not to exceed said limit, the charge times cannot be reduced too much.

Other problems common to all known batteries include the substantial weight as compared to the quantity of energy that is transportable and the progressive loss of energy storage capacity in the course of the charge and discharge cycles.

In a fuel cell, electric energy is produced starting from some substances, typically hydrogen and oxygen, no thermal combustion process taking place, in that the principle of operation of fuel cells lies in the direct generation, starting from the reacting substances, for instance hydrogen and oxygen, of an electromotive force by way of an electrochemical reaction, as with electric batteries, instead of via energy conversion processes, as it occurs in electric generators operated by thermal combustion machines.

The electrochemical reaction is based on the concept of splitting the molecules of the combustible hydrogen or of the comburent oxygen into positive ions and electrons; the latter, by crossing an external circuit, provide an electric current proportional to the speed of the chemical reaction, said electric current being thus usable for any purposes.

A very interesting aspect of fuel cells consists in their possibility of being hydrogen-powered, while releasing water vapor only into the atmosphere, however hydrogen does not exist free in the nature, and consequently it must be produced. The hydrogen production process, without resorting to processes that release $CO_2$ into the atmosphere and consequently are harmful for the environment, uses electrolyzers, i.e. apparatuses capable of splitting water into hydrogen and oxygen by way of an electrolysis.

At present, the main limit of fuel cells is in their difficulty of storing hydrogen, for which pressure containers are necessary, and in the thermal alterations that occur both during the filling step and during the operation of the fuel cell.

The operating cycle of the present fuel cell systems is organized into three main steps, each of which uses a specific apparatus: the first step is producing hydrogen starting from water and needs a specific electrolyzer, the second step is transporting and storing the hydrogen which will be used to supply power to the fuel cell, that needs a special pressure tank (the pressure being typically 300 to 700 bars), and finally the third step is producing electric energy in the fuel cell itself.

The present motor vehicles powered with hydrogen are consequently equipped with hydrogen tanks from which the fuel cells are filled, whereas the electrolyzers used to produce hydrogen, which shall be connected to the electric mains in order to operate, are never installed on the movable means.

The most widespread systems for motor vehicles presently use tanks but, hydrogen being a highly inflammable substance, this entails major safety problems and their use features important risks and criticalities.

In order to obviate these problems, processes have been developed than exploit the property of some metal powders, in particular hydride metal powders, whereby they absorb and release hydrogen, said metal powders placed inside tanks being capable of storing in a small space big quantities of hydrogen at very low pressures, ranging from 1 to 10 bars, but being simultaneously capable of supplying power to the fuel cells for a long time (much longer than high pressure tanks).

However, such technical solution presents a number of significant limitations, basically bound to two factors: one physical, related to the increase of temperature while hydrogen is taken in and to the decrease of temperature while hydrogen is taken out, whereas the other is an operational one and is related to the infrastructures necessary to fill hydrogen being rare.

During a fast recharging step, the blisters, i.e. the containers internally to which there are located the hydride metal powders, heat up to reaching high temperatures, even up to 100-150° C., with risks of fire and burns, furthermore the increased temperature entails an energy dissipation which might reduce efficiency by as much as 30%.

On the contrary, while hydrogen is supplied from the tank to the fuel cell, the decrease in temperature caused by the expansion of the gas results in a condensation of the atmospheric humidity and a consequent formation of ice, both on the tank and on the pipings, and subsequently, when ice melts, the water formed shall be properly collected and discharged.

Systems of a combined type are known for a long time, also referred to as "regenerative" fuel cells, wherein a standard fuel cell is supplemented by an electrolytic cell so that, by supplying electric current to the electrolytic cell, it is possible to "regenerate" the hydrogen consumed by the fuel cell during the discharging step.

Systems of this type are disclosed for instance in U.S. Pat. No. 3,839,091A, which discloses an apparatus formed of a fuel cell and an electrolyzer: the electrolyzer produces, by electrolysis, hydrogen and oxygen, which are stored in two separate compartments and are used by the fuel cell to generate electric energy.

Likewise, patent application US2002017463A1 discloses an apparatus which couples an electrolytic cell with a fuel cell; the hydrogen electrolytically produced by the electrolyzer device is stored in an appropriate tank connected to the fuel cell which uses it during the discharging step to generate electric current.

International patent application WO2005008824A2 discloses a further example of a combined system formed of two separate devices coupled with each other, namely an electrolytic cell, which generates and stores hydrogen, and a fuel cell; in the solution disclosed in WO2005008824A2, both devices are formed of two electrodes and one separator respectively; if necessary, the possibility is also envisaged that the two devices have an electrode in common. In all apparatuses described so far, the fuel cell, the tank used to store hydrogen, and the electrolyzer are independent devices which are coupled together so as to make-up a combined system, which results in increased overall dimensions, weight and number of component parts, considering the need for providing an electrolytic cell, a fuel cell, a hydrogen tank, a water and oxygen tank, and appropriate interconnection channels.

For these reasons, the systems of the type described above presently known in the art are not usable to realize small-size rechargeable fuel cells suitable for being used as batteries for portable electronic devices, such as computers, tablets, and cell phones, nor as fuel cells for motor vehicles and motorcycles.

Bimodal batteries have recently been developed, wherein consumption of hydrogen, during the discharging step, and hydrogen generation, during the charging step, take place internally to one and the same cell, by using two only electrodes.

An example of systems of said type is disclosed in U.S. patent application US20060003203A1, wherein a battery is claimed capable of producing hydrogen electrolytically and of consuming said hydrogen during the discharging step to produce electric energy; however, the apparatus described in US20060003203A1 is not a true fuel cell, but rather a hydride/air battery in that it is not possible to recharge the apparatus by way of a direct injection of hydrogen from the external world, but only in the form of electric energy.

A well-known disadvantage of "regenerative" fuel cells, being rechargeable electrically only, is the duration of the charging step, as a matter of fact the electrolysis process necessary to regenerate hydrogen needs long period of times, usually several hours, during which the apparatus shall remain connected to the electric mains. Therefore, such solution is difficult to implement for many applications and is definitely little practical, being it necessary to plan in advance when the battery should be recharged, to be capable of subsequently using it at a later time, as with motor vehicles, whose batteries are usually recharged overnight.

On the contrary, fuel cells that are only rechargeable by way of a direct injection of hydrogen provide extremely short charging times, generally in the order of few minutes, but presently hydrogen filling stations are little widespread.

A further example of an electrolytic cell of a known type is disclosed in U.S. patent application US 2001/033959 A1, wherein a cathode for fuel cells and an alkaline fuel cell comprising such cathode are claimed, said fuel cell being capable of starting up very rapidly.

The electrolytic cell disclosed in US 2001/033959 A1 comprises in particular a cathode at least partially formed of metal alloys capable of storing pure oxygen and an anode formed of non-precious metal alloys, capable of storing hydrogen; however, the hydrogen accumulated thickness is limited down to a thin surface layer of the anode, which allows to store just the hydrogen necessary to guarantee a fast start up of the device, whereas it does not allow to accumulate hydrogen in such quantity as to provide a long-lasting discharging step, during which hydrogen is progressively oxidized to produce electric energy.

In addition, the anodic electrode according to US 2001/033959 A1 is formed of inexpensive metal alloys, not of precious metals, hence it is not resistant in acid environments nor can it be used in the presence of carbon dioxide, which would otherwise result in harmful carbonation reactions of the electrolyte adjacent to said anodic electrode; for this reason, it is necessary to use pure oxygen to supply power to the cathodic electrode instead of the atmospheric air.

OBJECTS AND SUMMARY OF THE INVENTION

An object of the present invention is to provide an energy accumulation device that can be recharged both by using the electric energy supplied by normal battery chargers, and by way of a direct supply of hydrogen.

A further object of the present invention is to provide a device of said type that is extremely light and compact, economical, reliable, and easy to install, such as to be possibly advantageously used for a number of types of applications: from fast recharged devices for cell phones, to devices for supplying power to electric vehicles or in any other application where reduced overall dimensions and weight are required.

These objects and others are achieved thanks to a surprising integration of elements, to form one and the same device which integrates the functions of an electrolyzer to produce hydrogen, a hydride metal tank to accumulate hydrogen, and a fuel cell receiving power from said hydrogen.

Unlike the known solutions, the device according to the present patent application comprises one cell only, where hydrogen, adsorbed in hydride metals, is stored and internally to which both the reactions necessary to produce electric energy starting from hydrogen and the electrolysis reaction necessary to produce hydrogen when the cell is connected to the electric mains take place, while allowing at the same time to recharge hydrogen even by way of a direct supply of gaseous hydrogen from the external world. The subject device features reduced overall dimensions and weight and makes it possible to surprisingly couple the advantages of fuel cells rechargeable by way of a direct injection of hydrogen with the advantages of the "regenerative" fuel cells which allow to regenerate the previously consumed hydrogen, when they are connected to the electric mains.

The present invention comprises:
- a cathodic electrode mainly formed of a conductive substrate and a catalyst capable of electrochemically reducing the oxygen in the air that is conveyed internally thereto;
- an electrically insulating separator, characterized in that it is impermeable to hydrogen and functionalized with ion exchange groups;
- an anodic electrode mainly formed of a conductive substrate and a catalyst capable of electrochemically oxidizing hydrogen;
- a support adjacent to the negative electrode, mainly containing hydride metal powders capable of rapidly absorbing big quantities of gaseous hydrogen (up to 2-3% by weight) and of gradually releasing it as a function of the demand;
- an external water tank through which air is made pass through, if necessary, in order to be humidified before being conveyed to the cathode of the battery; this tank belongs to a closed hydraulic circuit, which collects the water that is formed from the recombination of hydrogen with oxygen upon supplying electric energy.

Very advantageously can in the present device the reintegration of the consumed hydrogen take place in two different charging modes of the device.

In a first mode, the device is charged by way of electric energy, via a battery charger which is connected to the poles of the device, whereby the latter behaves as an electrolyzer which exploits the electric current supplied to split the water molecules, introduced together with the air flow into the cathodic compartment, into hydrogen at the anode and oxygen at the cathode; the hydrogen molecules are adsorbed by the hydride metal powders present in the hydrogen storage compartment, thus filling the device with hydrogen, at a maximum pressure of approximately 8 bars. The charging times of the device according this mode are similar to those of the usual batteries.

In a second mode, the charge takes place by way of a direct injection of hydrogen: this mode consists of directly introducing into the anodic compartment low pressure (1-8 bars) gaseous hydrogen, which is rapidly adsorbed by the metal hydrides. Advantageously this second mode makes it possible to perform a complete recharge in much shorter times than those necessary for recharging according to the first mode.

It is worth emphasizing that the charge according to the second mode, i.e. by way of a hydrogen injection, is an exothermic process, which generates rather high temperatures; in the present invention, it is deemed very convenient to take advantage of an air conveyor which, besides conveying air through the cathodic compartment to bring the oxygen necessary as a reagent during the discharging step, is also kept active during the charging step by injection of hydrogen, to make it possible to remove the heat that generates therein and thus to cool down the adsorbing powders.

In this respect, it is also worth noting that, thanks to the arrangement of the device and to its dimensional characteristics (in particular, width and length are much greater than thickness), it is possible to store hydrogen in a more efficient manner than it is possible to do by inserting the same quantity of metal powders internally to a pressure tank because, in this innovative system, cooling—which is necessary during the charge exothermic process by way of a direct injection of hydrogen—can take place in a much faster and more effective manner thanks to the larger heat exchange surface area.

Advantageously is the cathodic electrode of the device according to the present patent application, unlike a cathode of a usual fuel cell, substantially carbon-free so as to prevent its degradation down to carbon dioxide during the recharging step by way of electric energy.

The discharging step consists of an electrochemical oxidation process (transfer of electrons) on the hydrogen released by the hydride metal absorber and simultaneously of a reduction process (gain of electrons) of the oxygen present in the air; the products of the redox reaction also include—besides electric energy—thermal energy and water, without any production of toxic or polluting substances. Such discharging step is altogether formed of an endothermic process for that which concerns hydrogen desorption and of an exothermic process for that which concerns the electric current production redox reaction, which compensate for each other and prevent too low or too high temperatures from being reached, thus increasing the overall energy efficiency.

DETAILED DESCRIPTION OF AN EMBODIMENT OF THE INVENTION

Figure 1:
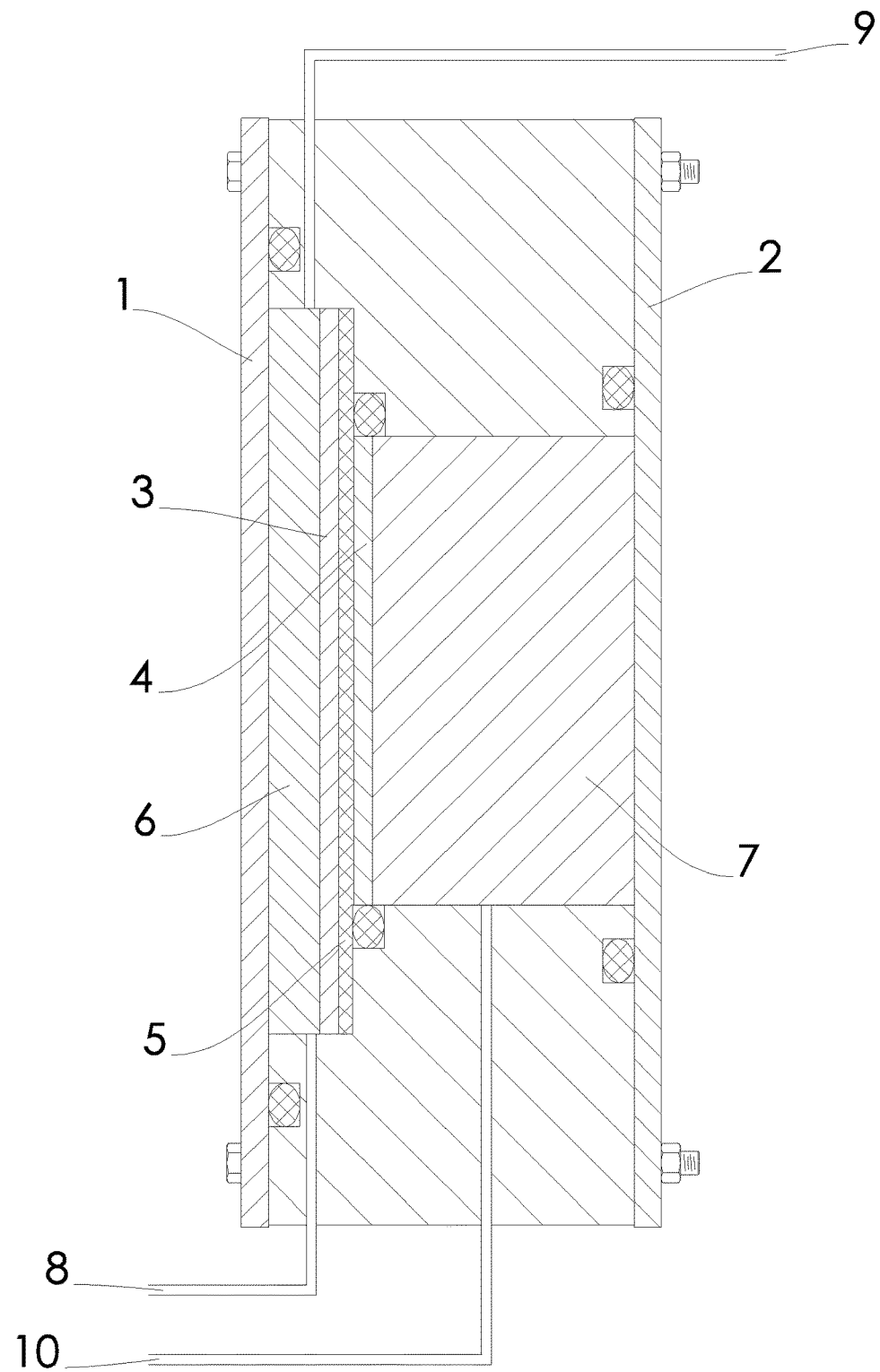
FIG. 1 shows a vertical cross section of a possible embodiment of the electrochemical cell according to the present patent application; the figure shows a positive current collector (1), a negative current collector (2), a cathodic electrode (3), an anodic electrode (4), a gas-impermeable polymeric separator membrane (5), a porous support (6) operating as a gas diffusion layer, a porous support (7) containing hydride metal powders, humidified air inlet channels (8), and air outlet channels (9) to let air leave said porous support (6), and a gaseous hydrogen inlet channel (10) to let hydrogen enter said porous support (7).
Figure 2:
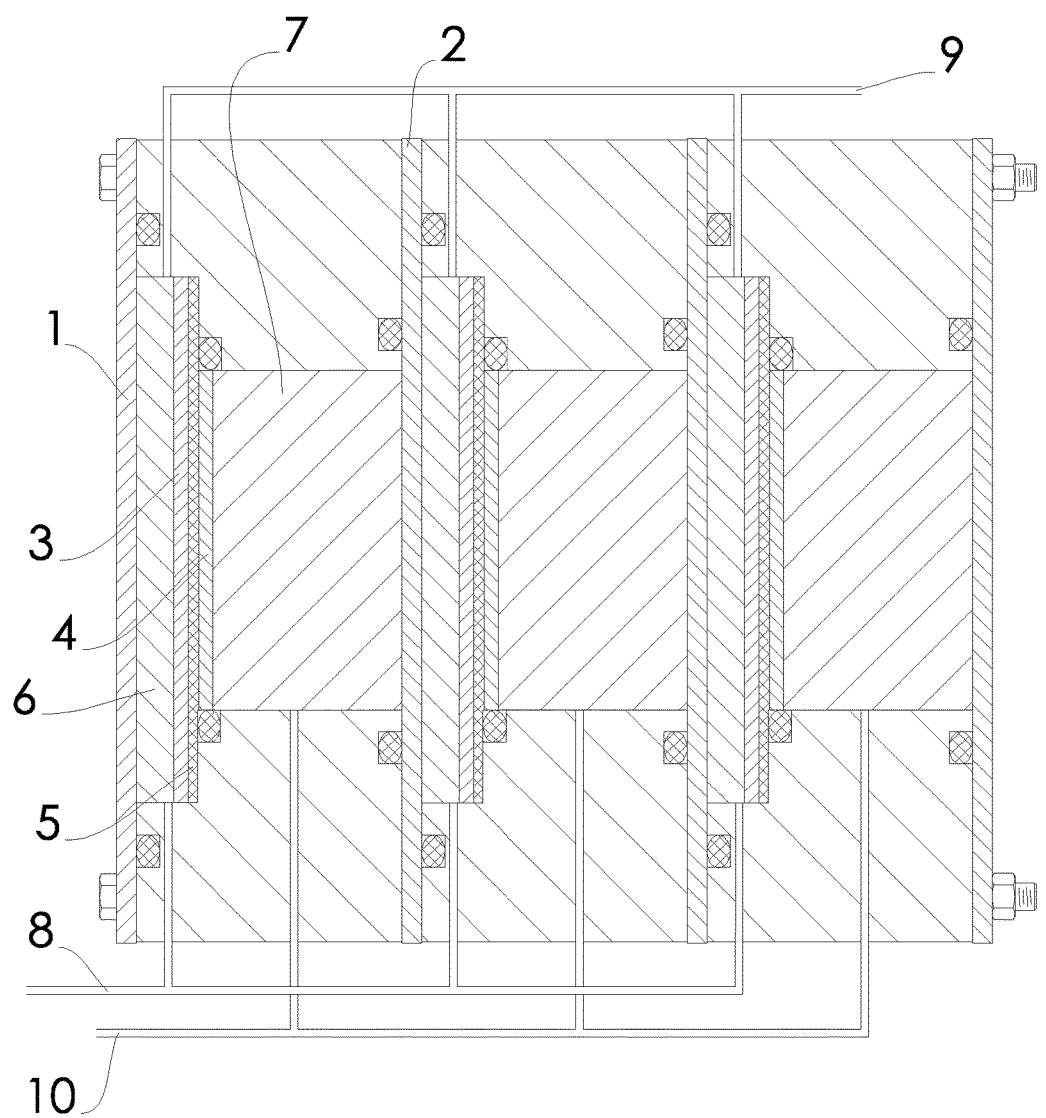
FIG. 2 shows a vertical cross section of a battery formed of three electrochemical cells of the type shown in FIG. 1, connected in series to each other; in the embodiment here illustrated there are provided air diffusion channels (8, 9) in communication with each other as the gaseous hydrogen inlet channels (10) do.

In a particularly complete embodiment, the rechargeable electrochemical cell according to the present patent application comprises:
- a positive electric current collector (1) and a negative electric current collector (2), each of which is formed of a sheet of a high electric and thermal conductivity material, impermeable to reagents (in particular oxygen and hydrogen) and featuring a high mechanical strength. Said collectors (1, 2) can for instance be made from stainless steel, graphite, titanium, or nickel;
- a cathodic electrode (3) and an anodic electrode (4), each of which is substantially formed of a conductive substrate (onto which the catalyst is anchored and which allows an electronic transfer from the current collector to the catalyst itself), a polymeric binder (preferably consisting of a water dispersion of polytetrafluoroethylene) and a catalyst. The catalyst performs two different functions depending on whether the electrochemical cell is in the discharging step or in the charging step by way of electric current: in the case of the cathodic electrode, during the discharging step, the catalyst electrochemically reduces the oxygen in the air conveyed internally to the cathodic compartment, whereas in the charging step by way of electric energy the catalyst gets oxygen by splitting the water molecules introduced into the cathodic compartment together with the air flow; in the case of the anodic electrode, during the discharging step, the catalyst electrochemically oxidizes the hydrogen present in the anodic compartment, whereas in the charging step by way of electric energy it generates hydrogen by splitting the water molecules that electro-osmotically permeate from the cathode via a polymeric membrane (5). Advantageously are the width and the length of the electrodes much greater than their thickness and the latter is preferably in the order of some tenths of millimeters at most;

an ion exchange polymeric membrane (5) which is interposed between the cathodic electrode (3) and the anodic one (4) and is capable of electrically insulating said two electrodes (3, 4); said membrane (5) provides for ionic conductivity and impermeability to gases (in particular to hydrogen and to oxygen) and features a high thermal stability;

an electrically conductive porous layer (6), interposed between the positive current collector (1) and the cathodic electrode (3) and operating as a gas diffusion layer;

an electrically conductive porous layer (7), interposed between the anodic electrode (4) and the negative current collector (2), said porous layer (7) being impregnated with catalyst powders (substantially formed of lanthanum, nickel, cobalt, manganese, or aluminium metal alloys) capable of quickly absorbing big quantities of gaseous hydrogen (up to 2-3% by weight), preferably up to reaching a maximum pressure of 8 bars, and of gradually releasing it according to the actual needs. Said porous layer (7) preferably has the same width and length as the anodic electrode (4), but its thickness is 20-30 times greater than the latter, so as to be capable of containing a sufficient adsorbing alloy material to store quantities of hydrogen proportioned to the demand of the electrochemical cell;

a frame suitable for accommodating the component parts of the electrochemical cell, made from a plastic material (such as, for instance, natural or fiber glass reinforced PPO, PPS, PEEK), gas-impermeable and capable of providing for the electric insulation of the electrochemical cell;

electrically insulating fixing screws, suitable for connecting the component parts of the frame to each other, while firmly keeping the individual component parts of the electrochemical cell joined together;

flat or ring gaskets, of the "o-ring" type, made from materials impermeable to reagents (such as, for instance, silicone, EPDM, NBR, Viton) which provide for the hermetic seal of the anodic compartment and of the cathodic compartment of the cell; in particular, there are provided two gaskets, one in contact with the negative current collector (2) and the other in contact with the polymeric separator membrane (5) which provide for hydrogen seal in the anodic compartment where pressurized hydrogen is stored; a third gasket is in contact with the positive current collector (1) and provides for air tightness in the cathodic compartment;

reagent diffusion channels inside the compartment of the electrochemical cell, in particular the cathodic electrode (3) is connected to a humidified air inlet channel (8) and to an air outlet channel (9); conversely, in the anodic compartment there is present one inlet only (10), through which gaseous hydrogen can be directly injected into the porous support (7), during the hydrogen charging step; such inlet is closed after reaching a maximum pressure value of approximately 8 bars;

a water tank (11) through which the air input to the cathodic compartment is made pass, if necessary, before being conveyed to the cathode of the battery (3); very advantageously is this tank (11) part of a closed circuit which collects the water that forms, in the electric energy supply step, from recombination of hydrogen with oxygen.

According to a possible embodiment of the electrochemical cell according to the present invention, said ion exchange membrane (5) is of the cationic type and is formed of a polymeric matrix with acid functional groups. In this case, in the cathodic electrode (3), the substrate is formed of a platinum or platinum-plated titanium net and the catalyst is formed of platinum and iridium nanoparticles, whereas in the anodic electrode (4) the substrate is formed of a carbonaceous material (such as carbon cloth or carbon paper) and the catalyst is formed of platinum nanoparticles; the porous layer (6) is formed of a carbonaceous material, for instance a layer of carbon paper.

In an alternative embodiment, said membrane (5) is of the anionic type and is formed of a polymeric matrix with basic functional groups. In this case, in the cathodic electrode (3) the substrate is formed of a nickel net or foam and the catalyst is formed of oxides, perovskites or spinels of metals such as cobalt, lanthanum, manganese, nickel, iron, whereas in the anodic electrode (4) the substrate is formed of a nickel or cobalt net or foam or of a carbonaceous material (such as carbon cloth or carbon paper) and the catalyst is formed of palladium or is formed of a nickel and aluminium metal sponge, known under the trade name "nickel Raney®"; the porous support (6) is formed of one or several layers of nickel foam.

The operation of the electrochemical cell according to the present invention is organized into two main operating steps, namely the charging step and the discharging step. The charging step makes it possible to re-integrate the hydrogen consumed during the discharging step and can advantageously be performed in two alternative manners, namely by connecting to the electric mains or by way of a direct injection of gaseous hydrogen.

In a first charge mode, the collectors (1, 2) are connected to the electric mains and in this case the cell behaves as an electrolyzer, in that it splits the water molecules introduced together with the air flow into the cathodic compartment; said air molecules are split into hydrogen at the anode (4) and oxygen at the cathode (3). The hydrogen thus obtained is adsorbed by the hydride metal powders present in the porous support (7), where it is stored, preferably at a pressure not exceeding a maximum value of 8 bars. In this first mode, the charge times are similar to those of the usual electric batteries.

In the second electrochemical cell charge mode, gaseous hydrogen is injected at a low pressure (generally from 1 to 8 bars) directly into the porous support (7), where it is rapidly adsorbed by the metal hydrides.

The discharging step comprises an electrochemical oxidation process (transfer of electrons) of the hydrogen released by the porous support (7) and simultaneously a reduction process (gain of electrons) of the oxygen in the air input to the cathode (3).

Should a greater electric energy storage capacity be required, two or more electrochemical cells of the type described above can be coupled together to form a series. In a particularly efficient embodiment, at the opposed ends of the battery there are placed the negative main current collector and the positive main collector, whereas every pair of adjacent cells is separate by one current collector, whose thickness is less than that of said main collectors.

The overall system is tightened by means of electrically insulating screws and is assembled by using such gaskets as to provide for a hermetic seal of the structure itself, which shall be capable of withstanding hydrogen pressures up to 8-10 bars.

Channels are provided for every cell to make the reagents diffuse internally to the frame and in particular there are provided an air inlet and an air outlet to/from the cathodic compartment and a hydrogen inlet to the anodic compartment; a special embodiment might also comprise air diffusion channels communicating with each other, internally to the frame, as well as the hydrogen ones.

The invention claimed is:

1. An integrated rechargeable electrochemical cell, comprising:
    a positive electrical current collector formed of a high thermal and electric conductivity material;
    a negative electrical current collector formed of a high thermal and electric conductivity material;
    a cathodic electrode formed of a conductive substrate, a polymeric binder, and a catalyst which during the charging step by means of an electrical current is capable of splitting water molecules in air conveyed internally thereto, thus obtaining oxygen, whereas in the discharging step it is capable of electrochemically reducing the oxygen of the air conveyed internally thereto;
    an anodic electrode formed of a conductive substrate, a polymeric binder, and a catalyst, which during the charging step by means of an electrical current is capable of splitting water molecules that electro-osmotically permeate from the cathodic electrode through a separator, thus obtaining hydrogen, whereas during the discharging step it is capable of electrochemically oxidizing the hydrogen present in the anodic compartment;
    a gas-impermeable and electrically insulating separator, placed between said electrodes and formed of a polymeric membrane rich in ion exchange groups and capable of guaranteeing ionic conductivity;
    a first electrically conductive porous support, placed between said cathodic electrode and said positive current collector, performing the function of a gas diffusion layer;
    a second electrically conductive porous support, placed between said anodic electrode and said negative current collector, containing powders of hydride metals capable of rapidly absorbing gaseous hydrogen up to 2-3% by weight and gradually releasing it;
    an air inlet channel suitable for conveying air into said first electrically conductive porous support;
    an outlet channel for extracting air from said first electrically conductive porous support;
    said cathodic electrode and said first electrically conductive porous support form a gas-impermeable and hermetically sealed cathodic compartment between the positive current collector and the separator, whereas said anodic electrode and said second electrically conductive porous support form a gas-impermeable and hermetically sealed anodic compartment between the negative current collector and the separator, characterized in that the anodic compartment features an inlet channel through which it is possible to inject gaseous hydrogen directly into said second electrically conductive porous support in which said hydrogen is adsorbed, said second electrically conductive porous support having the same width and length as the anodic electrode but a thickness 20 to 30 times greater.

2. The electrochemical cell of claim 1, wherein said air inlet channel is connected to an external tank which collects the water formed during the electrical power supply step from the recombination of hydrogen with oxygen; through said tank the air inlet from the air inlet channel is made to pass through, if necessary, before being conveyed to the cathodic electrode of the electrochemical cell in order to humidify it.

3. The electrochemical cell of claim 2, wherein said separator is an ion exchange membrane of the cationic type, substantially formed of a polymeric matrix with acid functional groups.

4. The electrochemical cell of claim 3, wherein in the anodic electrode the substrate is formed of a carbonaceous material and the catalyst is formed of platinum nanoparticles.

5. The electrochemical cell of claim 3, wherein said first electrically conductive porous support is formed of a carbonaceous material.

6. The electrochemical cell of claim 2, wherein said separator is an ion exchange membrane, substantially formed of a polymeric matrix with basic functional groups.

7. The electrochemical cell of claim 1, wherein said separator is an ion exchange membrane of the cationic type, substantially formed of a polymeric matrix with acid functional groups.

8. The electrochemical cell of claim 7, wherein in the cathodic electrode the substrate is formed of a platinum or platinum-coated titanium net and the catalyst is formed of platinum and iridium nanoparticles.

9. The electrochemical cell of claim 8, wherein in the anodic electrode the substrate is formed of a carbonaceous material and the catalyst is formed of platinum nanoparticles.

10. The electrochemical cell of claim 9, wherein said first electrically conductive porous support is formed of a carbonaceous material.

11. The electrochemical cell of claim 7, wherein in the cathodic electrode the substrate is formed of a nickel net or foam and the catalyst is formed of oxides, perovskites or spinels of metals like cobalt, lanthanum, manganese, nickel, iron, or a combination of said metals.

12. The electrochemical cell of claim 1, wherein said separator is an ion exchange membrane, substantially formed of a polymeric matrix with basic functional groups.

13. The electrochemical cell of claim 12, wherein in the anodic electrode the substrate if formed of a nickel or cobalt foam or net or of a carbonaceous material and the catalyst is formed of palladium or a nickel and aluminium metallic sponge.

14. The electrochemical cell of claim 12, wherein said first electrically conductive porous support is formed of a nickel foam.

15. A rechargeable electrochemical device, wherein the electrochemical device comprises a plurality of electrochemical cells of claim 1.

16. The rechargeable electrochemical device of claim 15, wherein said plurality of electrochemical cells is connected in series.

17. The rechargeable electrochemical device of claim 16, wherein the positive current collector of a cell makes-up the negative current collector of the immediately adjacent cell.

18. The rechargeable electrochemical device of claim 15, wherein one or more of the air inlet channels that convey air from the exterior of one or more of the electrochemical cells to one or more of the first electrically conductive porous supports are in communication with each other.

19. The rechargeable electrochemical device of claim 15, wherein one or more of the inlet channels through which hydrogen is injected from the exterior of one or more of the electrochemical cells to one or more of the second electrically conductive porous supports are in communication with each other.

20. The rechargeable electrochemical device of claim 15, wherein one or more of the outlet channels that convey air from the one or more of the first electrically conductive porous supports to the exterior of one or more of the electrochemical cells are in communication with each other.

* * * * *